United States Patent [19]
Matsuda et al.

[11] Patent Number: 4,952,364
[45] Date of Patent: Aug. 28, 1990

[54] METHOD OF CONTROLLING INJECTION MOLDING MACHINE

[75] Inventors: Kazuo Matsuda, Kyoto; Nobuaki Inaba, Kanagawa; Masashi Kaminishi, Osaka; Tetsuji Funabashi, Osaka; Nobukazu Tanaka, Osaka, all of Japan

[73] Assignee: Kabushiki KaishaKomatsu Seisakusho, Tokyo, Japan

[21] Appl. No.: 334,271

[22] PCT Filed: Apr. 28, 1988

[86] PCT No.: PCT/JP88/00434
§ 371 Date: Dec. 29, 1988
§ 102(e) Date: Dec. 29, 1988

[87] PCT Pub. No.: WO88/08783
PCT Pub. Date: Nov. 17, 1988

[30] Foreign Application Priority Data
May 8, 1987 [JP] Japan .................. 62-110783

[51] Int. Cl.$^5$ .............................. B29C 45/77
[52] U.S. Cl. ................. 264/40.1; 264/328.1; 425/145; 425/161; 425/562
[58] Field of Search ............. 264/40.1, 40.5, 328.1, 264/328.13; 425/135, 145, 146, 147, 150, 161, 166, 171, 562

[56] References Cited

U.S. PATENT DOCUMENTS

| 3,371,384 | 3/1968 | Nouel | 425/166 |
| 3,861,841 | 1/1975 | Hanning | 425/573 |
| 4,326,255 | 4/1982 | Fujita | 264/40.1 |
| 4,632,652 | 12/1986 | Farrell | 264/40.5 |

FOREIGN PATENT DOCUMENTS

| 62-85922 | 4/1982 | Japan . |
| 58-145353 | 8/1983 | Japan . |
| 59-64337 | 4/1984 | Japan . |
| 59-185561 | 10/1984 | Japan . |
| 60-242022 | 12/1985 | Japan . |

Primary Examiner—Jill L. Heitbrink
Attorney, Agent, or Firm—Diller, Ramik & Wight

[57] ABSTRACT

A method of and apparatus for controlling an injection molding machine by reproducing injection time and stability of an inspection speed to thereby improve precision, stable moldability. In the injection molding machine, a nozzle valve (4) for changing the opening of this nozzle is disposed at the tip of the nozzle for injecting a molten resin, the degree of opening of this nozzle valve (4) is controlled to a predetermined quantity of opening in accordance with a preset screw moving position and the flow rate of an operation oil for pushing a screw (6) is controlled in accordance with the degree of opening of the nozzle valve (4).

12 Claims, 2 Drawing Sheets

METHOD OF CONTROLLING INJECTION
MOLDING MACHINE

CROSS-REFERENCE TO RELATED APPLICATION

This application is related to pending application Ser. No. 320,264 filed Dec. 1, 1988 which is the national phase filing for PCT/JP88/00351 of Apr. 7, 1988, in the name of K. Matsuda et al entitled APPARATUS FOR CONTROL OF INJECTION MOLDING MACHINE.

TECHNICAL FIELD

This invention relates to a method of controlling an injection molding machine, and more particularly to a method of controlling an injection process of a viscoelastic molten resin in an injection molding machine.

BACKGROUND ART

It has been known that, in the injection molding machine, the injection speed of a molten resin largely influences properties (precise and stable moldability or the like) of moldings. Hence it is necessary to control properly the injection speed of the molten resin to be filled into a mold.

In order to control the injection speed as described above, in the so-called screw-type injection molding machine, the advancing speed of a screw which applies pressure to the molten resin charged in a barrel is properly changed, and thereby the injection speed of the molten resin to be filled in the mold is controlled.

Heretofore, in order to change the advancing speed of the screw as described above, a flow control valve is installed in an oil pipe which supplies working oil to a driving device (a hydraulic cylinder, an injection ram or the like) for advancing the screw, and the flow rate of the hydraulic oil is controlled by this flow control valve.

Now, an example of such conventional control method will be described. When, for example, the multistages of the injection speed in one injection process are set in order to improve properties of moldings, a position detector for detecting the position of the screw, a setting device of the switching position of the screw speed and a setting device of the screw speed (the injection speed) are used. Control is performed so that the degree of opening of the flow control valve corresponds to the degree of opening for a preset flow rate at a preset screw position, thereby the screw speed is controlled in multiple stages. It is to be noted that such control methods have been disclosed, for example, in Japanese Patent Provisional (Kokai) Publication No. 48-95458 (1973) and Japanese Patent Provisional (Kokai) Publication No. 59-64337 (1984).

In the conventional control method described above, the injection speed is controlled merely by controlling the travel speed of the screw. Hence, the travel speed of the screw does not always correspond to the actual injection speed of the molten resin injected through the nozzle.

This is caused, for example, by the following phenomenon. When the screw presses the molten resin during the filling process, the pressure of the molten resin within the barrel formed in the front end of the screw is increased. If the forward movement of the screw is halted under this condition, the injection speed of the molten resin is expected to become zero. Actually, however, the compressed molten resin within the barrel formed in the front end of the screw flows out through the injection nozzle into the mold until its pressure is reduced down to the pressure corresponding to the loading pressure within the mold, and as a result, the actual injection speed does not become zero immediately when the movement of the screw is halted.

Another example, in which the actual injection speed also differs from the injection speed set by the travel speed of the screw, is as follows. Contrary to the first example, when the screw is rapidly accelerated from the halting state, it is necessary for the pressure of the molten resin to be sufficiently increased until the actual injection speed corresponds to the screw speed. Hence, there occurs a delay in response corresponding to the elastic compression time of the molten resin, and it will be understood that the actual injection speed differs from the injection speed set by the travel speed of the screw during that time interval. The reason why there is a difference between the injection speed of the actually injected molten resin and the injection speed set by the moving speed of the screw is considered to be due to elasticity of the molten resin.

As described above, in the conventional control method, the actual injection speed of the molten resin can not be exactly controlled no matter how exactly the screw speed is controlled. Hence, repeatability of the injection time and stability of the injection speed are destroyed, and it is difficult to improve moldability for greater accuracy and stability.

It is an object of the present invention to provide; taking into account of the above-described circumstances, a control method of an injection molding machine which secures as much as possible repeatability of the injection time and stability of the injection speed and thereby improves moldability for greater accuracy and stability.

DISCLOSURE OF THE INVENTION

In the control method of an injection molding machine according to the present invention, a nozzle valve for changing the degree of opening of a nozzle is disposed at the front portion of the nozzle. The amount of the degree of opening of this nozzle valve is switched to a preset amount of the degree of opening at preset positions of the screw. At the same time, the flow rate of a hydraulic oil for pressing the screw is changed in accordance with the degree of opening of the nozzle valve. By thus directly controlling molten resin injected from the nozzle by the nozzle valve switchable to a preset degree of opening in accordance with the preset positions of the screw and changing the flow rate of the hydraulic oil for pressing the screw in accordance with the degree of opening of the nozzle valve, responsiveness between the actual injection speed of the molten resin injected through the nozzle and the injection speed set by the travel speed of the screw is improved.

BEST MODE FOR GATHERING OUT THE INVENTION

Figure 1:
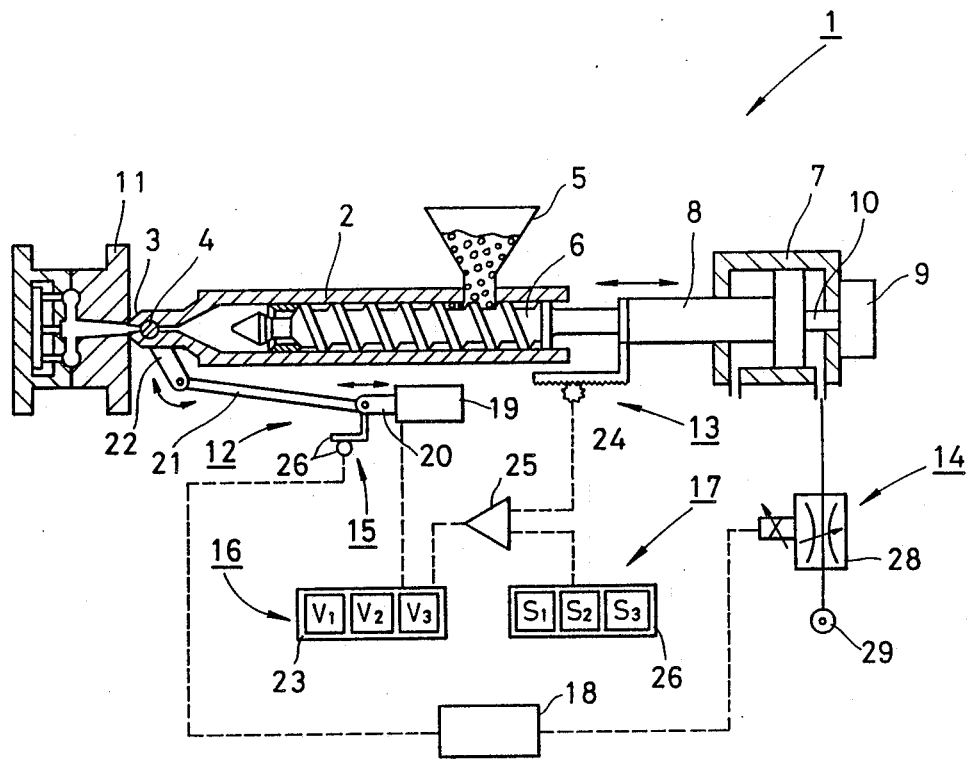
FIG. 1 is a schematic configurational diagram of a screw-type injection molding machine according to the present invention.

FIG. 1 is a schematic configurational diagram of the so-called screw-type injection molding machine to which the control method of the injection molding machine according to the present invention is applied.

In a screw-type injection molding machine 1, a nozzle 3 is disposed in a body at a front end portion of a barrel 2 into which a molten resin is charged. Within the nozzle 2, a cylindrical nozzle valve 4 for changing the degree of opening (the sectional area of the opening) of the nozzle is rotatably supported. In a rear portion of the barrel 2, there is disposed a hopper 5 for supplying resin material. Further, within the barrel 2, a screw 6 for pressing molten resin is fitted slidably relative to the axial direction of the barrel 2 and rotatably within the barrel 2. At a rear end of the screw 6, there is disposed a hydraulic cylinder 7 for pressing the screw 6 toward a front end of the barrel 2, and a piston rod 8 of the hydraulic cylinder 7 is connected to a rear end of the screw 6. Further, a rotating shaft 10 of a hydraulic motor 9 is connected to the piston rod 8 of the hydraulic cylinder 7, and the turning effort of the motor 9 is transmitted to the screw 6 via the piston rod 8.

Now, the schematic operation of the above-described injection molding machine 1 will be described. A resin material supplied in the hopper 5 is sucked into the barrel 2 by the rotation of the screw 6, heated and plasticized during this process to become a molten resin, and stored at the front of the barrel 2. The screw 6 then retreats due to the pressure of the molten resin while being stored. When a predetermined amount of the molten resin has been stored within the front portion of the cylinder 2, hydraulic oil is supplied into a chamber in the hydraulic cylinder 7. This causes to advance the front end of the screw 6 toward the direction of the nozzle 3 and presses the molten resin through the nozzle 3, and injects the molten resin into a mold 11.

Now, a control device for controlling the injection speed of the molten resin in the above-described injection molding machine 1 will be described in detail.

A control device for controlling the injection speed of the injection molding machine 1 comprises a nozzle valve driving unit 12 for rotating the nozzle valve 4, screw position detection unit 13 for detecting the actual position of the screw 6, a flow rate control unit 14 for controlling the flow rate of the hydraulic oil supplied in the hydraulic cylinder 7, a nozzle valve opening detection unit 15 for detecting the actual degree of opening of the nozzle valve 4, a nozzle valve opening setting unit 16 for operating the nozzle valve driving unit 12 according to plural present target values of the degree of opening of the nozzle valve 4 which have previously been set, a screw moving position setting unit 17 for sending out signals corresponding to present plural target values of the screw positions which have previously been set, and a converter 18 for supplying driving current corresponding to the detected value by the nozzle valve opening detection unit 15 to the flow rate control unit 14.

In the above-described control device, the nozzle valve driving unit 12 comprises, as shown in FIG. 1, a proportional solenoid 19 the travelling distance of which changes in accordance with the amount of the driving current, an actuator 20 of the proportional solenoid 19 and a link mechanism coupling between the actuator 20 and the nozzle valve 4. The link mechanism comprises a rod 21 and a lever 22 coupling between the actuator 20 and the nozzle valve 4.

Further, the nozzle valve opening setting unit 16 comprises a nozzle valve opening setting device 23 for supplying the corresponding driving current to the proportional solenoid 19 so that the nozzle valve 4 is controlled at plural target values preset at one injection process. In other words in this embodiment, the nozzle valve 4 is controlled at three target values, $V_1$, $V_2$ and $V_3$, for the degree of opening. The screw position detection unit 13 comprises a screw position detector 21 for generating an electric signal corresponding to the position of the screw 6. The electric signal corresponding to the position of the screw 6 transmitted from the screw position detector 24 is input in a comparator 25.

Further, the screw position setting unit 17 comprises a screw position setting device 26 for generating the corresponding electric signals so that the screw 6 is controlled at plural target values preset at one injection process, i.e., three target values, $S_1$, $S_2$ and $S_3$, in this embodiment. The electric signals generated from the screw position setting device 26 is input in the comparator 25. The comparator 25 compares the electric signal corresponding to the position supplied from the screw position detector 24 with the electric signal corresponding to the target position supplied from the screw position setting device 26, and inputs the electric signal in the nozzle valve opening setting device 23 when the both signals coincide with each other. When electric signals corresponding to the target values, $S_1$, $S_2$ and $S_3$, are thus input from the comparator 25 into the nozzle valve opening setting device 23, the setting device 23 outputs the corresponding driving current to the proportional solenoid 19 so as to sequentially switch to the target values, $V_1$, $V_2$ and $V_3$, of the opening of the nozzle valve preset corresponding to the target values, $S_1$, $S_2$ and $S_3$, set in the screw position setting device 26. That is, when the electric signal corresponding to the target value $S_4$ is input from the comparator 25 into the nozzle value opening setting device 23, the setting device 23 outputs the corresponding driving current to the proportional solenoid 19 so that the nozzle valve 4 is set from the target value $V_1$ to the target value $V_2$. When the electric signals corresponding to the set values Sn (1- - - n) are thus sequentially input from the comparator 25, into the nozzle valve opening setting device 23, the set device sequentially supplies the corresponding driving current to the proportional solenoid 19 so that the nozzle valve 4 is set from the target value Vn to the target value Vn+1 (1- - - n).

On the other hand, the nozzle valve opening detection unit 15 comprises a detector 26 for generation an electric signal corresponding to the amount of rotation of the nozzle valve 4 by detecting the position of the actuator 20 which moves in accordance with the rotation of the nozzle valve 4. The electric signal corresponding to the detected value transmitted from the detector 26 is converted into a driving current corresponding to the detected value by the nozzle valve opening detection unit 15 by the converter 18 and supplied to the flow rate control unit 14.

The flow rate control unit 14 comprises, for example, an electromagnetic flow rate control valve 28. The opening of the flow rate control valve 28 is controlled by a driving current, converted by the converter 18, corresponding to the detected value by the nozzle valve opening detection unit 15. There is also shown in FIG. 1 an oil pump 29 for supplying hydraulic oil into the chamber in the hydraulic cylinder 7.

Now, the control method of the injection molding machine 1 by the above-described control device will be described.

A predetermined amount of molten resin is stored at the front end portion of the barrel 2, and then the oil pump is driven in order to inject the molten resin. At this time, the nozzle valve 4 is set at the target value $V_1$ of the opening. When the screw 6 is advanced as a result, a signal corresponding to the detected value of the screw position detector 24 is input in the comparator 25, and an electric signal corresponding to the target value $S_1$ is also input from the screw position setting device 26 in the comparator 25. The comparator 25 compares the detected value of the screw position detector 24 with the target value $S_1$ of the screw position setting device 26, and sets to the value $V_1$ set in the nozzle valve opening setting device 23 until the both values coincides with each other. When the signal corresponding to the target value $S_1$ has been input, the setting device 23 outputs the corresponding driving current to the proportional solenoid 19 so that the target value of the opening of the nozzle valve 4 is controlled from the $V_1$ to the $V_2$, and sets the nozzle valve 4 to the target value $V_2$ of the opening by the proportional solenoid 19. By the same processing, corresponding to the target value $S_2$ of the screw position setting device 26, the nozzle valve opening setting device 23 sequentially switches the nozzle valve 4 to the target value $V_3$ of opening and thus performs control.

Figure 2:
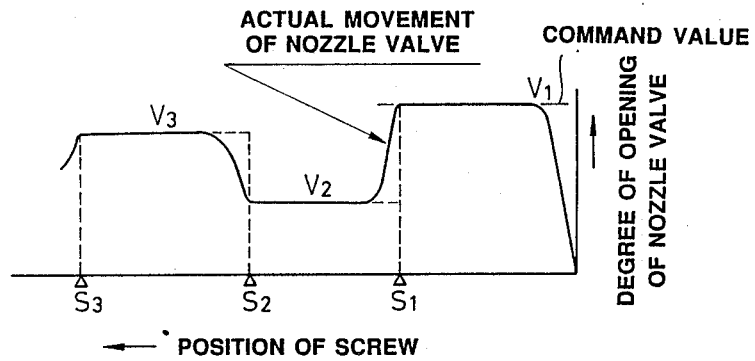
FIG. 2 is a graph showing the relationship between the degree of opening of a nozzle valve and the position of a screw.

FIG. 2 is a graph showing the relationship between the degree of opening of the nozzle valve and the position of the screw obtained in an experiment in the injection molding machine 1. It will be understood that the degree of opening of the nozzle valve 4 is switched in accordance with the command value (the target value) with an excellent responsiveness.

Figure 3:
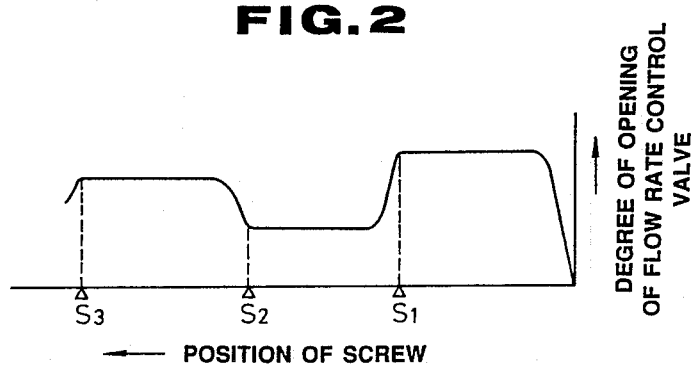
FIG. 3 is a graph showing the relationship between the degree of opening of a flow control valve and the position of a screw.

On the other hand, the actual amount of the degree of opening of the nozzle valve 4 is detected by the nozzle valve opening detector 26, and the flow rate control valve 28 controls the flow rate of the hydraulic oil in accordance with the detected value. Hence, as illustrated in the graph in FIG. 3. When, for example, it is tried to increase the injection speed by opening the nozzle valve 4, the degree of opening of the flow rate control valve 28 is also rapidly increased in accordance with the degree of opening of the nozzle valve 4. Further, when it is tried to decrease the injection speed by closing the nozzle valve 4, the degree of opening of the flow rate control valve 28 is also rapidly decreased in accordance with the degree of opening of the nozzle valve 4.

Figure 4:
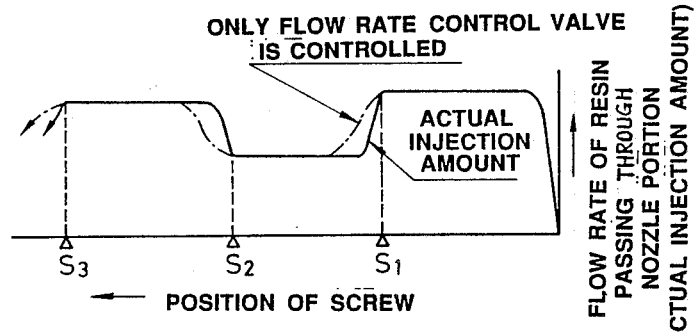
FIG. 4 is a graph showing the relationship between the actual injection amount and the position of a screw.

It will be understood that, since the flow rate of controlling the injection molding machine 1 described above, when the degree of opening of the nozzle valve 4 is controlled according to direct command values, i.e., preset target values of the opening of the nozzle valve, the speed of resin ejected from the nozzle can be controlled with higher accuracy than when the injection speed is controlled by controlling only the flow rate of the flow rate control valve as in the conventional case, as illustrated in the graph in FIG. 4 showing the relationship between the actual injection amount and the position of the screw by an experiment. It will be also understood that, in the case of switching from low-speed injection to high-speed injection, the molten resin compressed at the front end of the screw is ejected by the opening of the nozzle valve in the opening direction, and, at the same time, the amount of supply of the hydraulic oil for moving the screw is also increased, and hence the rising response is improved. Further, it will be understood that in the case of switching from high-speed injection to low-speed injection, the inertial flow of the compressed molten resin at the front end of the screw is controlled by nozzle valve so as to squeeze in the closing direction, and, at the same time, the amount of supply of the hydraulic oil for moving the screw is decreased, and hence the falling response is improved.

It will be noted that the flow rate of the hydraulic oil, the hydraulic oil for pressing the hydraulic cylinder 7 is controlled by a flow rate corresponding to the degree of opening of the nozzle valve as described above, energy-saving capability is improved when, for example, the variable pump method or bleeding-off method is employed in the hydraulic circuit. Further, injection speed is controlled by using together the flow rate control valve at the constant-speed region of the screw, i.e., the constant region of the target value of the degree of opening of the nozzle valve. Hence, stability of the constant-speed injection speed control is also improved.

INDUSTRIAL APPLICABILITY

The present invention is applicable to an injection molding machine which controls an injection process of a viscoelastic molten resin.

We claim:

1. A method of controlling an injection molding machine having a nozzle and a cylindrical nozzle valve rotatably disposed at an end portion of said nozzle for changing a sectional area of an opening of said end portion of said nozzle, in which an injection speed in one injection process is controlled, comprising the steps of:
   switching a degree of opening of said nozzle valve to a degree of opening preset corresponding to a position of a screw; and
   controlling a flow rate of a hydraulic oil for pressing said screw in accordance with the degree of opening of said nozzle valve.

2. A method of controlling an injection molding machine having a nozzle, a cylindrical nozzle valve rotatably disposed at a front end portion of said nozzle for changing a sectional area of an opening of said front end portion of said nozzle, and a screw fitted slidably within a barrel, in which an injection speed in one injection process is controlled, comprising the steps of:
   comparing one of a plurality of target values of screw positions preset by screw position setting means with a value detected by screw position detecting means for detecting a screw position, and when the both values coincide with each other, transmitting said coincided target value to nozzle valve opening setting means;
   switching a degree of opening of said nozzle valve, according to said one of the plural target values of the screw positions set by said screw position setting means, to one of a plurality of target values of the degree of opening of the nozzle valve preset at the nozzle valve opening setting means corresponding to said one of the plural target values of the screw positions;

controlling the degree of opening of said nozzle valve to a degree of opening corresponding to said one of the plural target values of the degree of opening of said nozzle valve by nozzle valve driving means; and detecting the degree of opening of the nozzle valve by nozzle valve opening detection means, and controlling a degree of opening of flow rate control means for controlling a flow rate of a hydraulic oil for pressing said screw, corresponding to the detected value of the degree of opening of the nozzle valve.

3. A method of controlling an injection molding machine according to claim 2, wherein said nozzle valve driving means comprises a proportional solenoid valve or servomotor having an actuator, in which a traveling amount of said actuator changes in accordance with an amount of current, and a link mechanism for coupling between said actuator and said nozzle valve.

4. A method of controlling an injection molding machine according to claim 3, wherein said link mechanism comprises a rod and a lever, for coupling between said actuator and said nozzle valve.

5. A method of controlling an injection molding machine according to claim 2, wherein said nozzle valve opening setting means comprises a nozzle valve opening setting device for suppling, in order to control said proportional solenoid valve or servomotor to said preset plural target values of the degree of opening, $V_1$, $V_2$ and $V_3$, in said one injection process, currents corresponding to the plural target values, $V_1$, $V_2$, and $V_3$, to said proportional solenoid valve or servomotor.

6. A method of controlling an injection molding machine according to claim 2, wherein said screw position detection means comprises a screw position detector for supplying the value detected by the screw position detection means corresponding to the position of said screw.

7. A method of controlling an injection molding machine according to claim 2, wherein said screw position setting means comprises a screw position setting device for generating said plural target values $S_1$, $S_2$, and $S_3$ of the screw positions so that, in said one injection process, said screw is controlled to said plural preset target values, $S_1$, $S_2$, and $S_3$ of the screw positions.

8. A method of controlling an injection molding machine according to claim 2, wherein said nozzle valve opening detection means comprises a proportional solenoid valve or servomotor having an actuator in which a traveling amount of said actuator changes in accordance with an amount of current, a link mechanism for coupling between said actuator and said nozzle valve, and a nozzle valve opening detector for generating a signal corresponding to an amount of rotation of said nozzle valve by detecting a movement of said actuator which moves in accordance with the amount of rotation of said nozzle valve.

9. A method of controlling an injection molding machine according to claim 2, wherein said flow rate control means comprises an electromagnetic flow rate control valve for controlling the flow rate of the hydraulic oil by a driving current corresponding to a value detected by said nozzle valve opening detection means.

10. A method of controlling an injection molding machine according to claim 3, wherein said nozzle valve opening setting means comprises a nozzle valve opening setting device for supplying, in order to control said proportional solenoid valve or servomotor to said preset plural target values, $V_1$, $V_2$, and $V_3$, of the degree of opening of said nozzle valve, currents corresponding to the target values, $V_1$, $V_2$, and $V_3$, to said proportional solenoid or servomotor.

11. A method of controlling an injection molding machine according to claim 3, wherein said nozzle valve opening detection means comprises a nozzle valve opening detector for generating a signal corresponding to an amount of rotation of said nozzle valve by detecting a movement of said actuator which moves in accordance with the amount of rotation of said nozzle valve.

12. A method of controlling an injection molding machine according to claim 8, wherein said flow rate control means comprises an electromagnetic flow rate control valve for controlling the flow rate of the hydraulic oil by a driving current corresponding to a value detected by said nozzle valve opening detection means.

* * * * *